(12) United States Patent
Cheng

(10) Patent No.: US 7,059,274 B2
(45) Date of Patent: Jun. 13, 2006

(54) COMBINATIVE PET CAGE

(76) Inventor: Kuo-Ho Cheng, P.O. Box 90, Tainan City 70499 (TW)

( * ) Notice: Subject to any disclaimer, the term of this patent is extended or adjusted under 35 U.S.C. 154(b) by 0 days.

(21) Appl. No.: 11/076,047

(22) Filed: Mar. 10, 2005

(65) Prior Publication Data

US 2006/0000422 A1  Jan. 5, 2006

(30) Foreign Application Priority Data

Jun. 30, 2004  (TW)  ............................. 93210257 U

(51) Int. Cl.
A01K 1/02 (2006.01)
A01K 31/06 (2006.01)
A01K 1/03 (2006.01)

(52) U.S. Cl. ...................... 119/455; 119/452

(58) Field of Classification Search ............... 119/452, 119/453, 455, 416, 417, 458, 459, 472–474, 119/482, 501, 516, 519, 523, 487–489, 481; D30/108–119; 229/120.1

See application file for complete search history.

(56) References Cited

U.S. PATENT DOCUMENTS

| | | | | |
|---|---|---|---|---|
| 1,106,267 A | * | 8/1914 | Wilson | 119/455 |
| 1,276,723 A | * | 8/1918 | Collis | 119/455 |
| 1,588,282 A | * | 6/1926 | Wachsman | 119/461 |
| 1,772,814 A | * | 8/1930 | Laycock | 220/4.01 |
| 1,966,840 A | * | 7/1934 | Wodrich | 217/36 |
| 2,121,658 A | * | 6/1938 | Gehret | 119/474 |
| 3,225,738 A | * | 12/1965 | Palencia | 119/455 |
| 3,429,297 A | * | 2/1969 | Schroer | 119/417 |
| 5,353,738 A | * | 10/1994 | Chiu | 119/461 |
| 5,794,567 A | * | 8/1998 | Itzhak | 119/416 |
| 6,352,076 B1 | * | 3/2002 | French | 128/203.12 |
| 6,832,580 B1 | * | 12/2004 | Marchioro | 119/452 |

* cited by examiner

Primary Examiner—Teri Pham Luu
Assistant Examiner—Joshua Michener

(57) ABSTRACT

A combinative pet cage comprises a front meshed board, a rear meshed board, a left meshed board, a right meshed board, a top meshed board, a bottom meshed board, a plurality of screw parts, and a plurality of connecting parts. The frame of each of the meshed boards is provided with screw holes for the insertion of the screw parts, whereby the meshed boards will be assembles to form a cage body. The top and bottom faces of the frames of the front meshed board and the rear meshed board are further provided with a plurality of insertion holes, whereby two such combinative pet cages can be connected vertically by the connecting parts. A plurality of pet cages can be connected in the same way, and the combined structure thereby formed will be stable.

1 Claim, 5 Drawing Sheets

COMBINATIVE PET CAGE

FIELD OF THE INVENTION

The present invention relates to pet cages, and more particularly to a combinative pet cage comprising a front meshed board, a rear meshed board, a left meshed board, a right meshed board, a top meshed board, a bottom meshed board, a plurality of screw parts, and a plurality of connecting parts. The frame of each of the meshed boards is provided with screw holes for the insertion of the screw parts, whereby the meshed boards will be assembles to form a cage body. The top and bottom faces of the frames of the front meshed board and the rear meshed board are further provided with a plurality of insertion holes, whereby two such combinative pet cages can be connected vertically by the connecting parts. A plurality of pet cages can be connected in the same way, and the combined structure thereby formed will be stable.

BACKGROUND OF THE INVENTION

Referring to FIG. 1, a pet cage 1 of the prior art comprises six meshed boards 10, being mutually connected by point welding spots 11 to form a rectangular pet cage 1. One of the meshed boards 10 is provided with a door 12 for the entrance of a pet. Each of the four corners of the cage is further provided with a leg 13. However, the meshed boards 10 of the pet cage of the prior art are fixed by welding and therefore cannot be disassembled or folded, resulting in inconvenience of storage and carrying. Further, the connection of the meshed boards 10 is usually by point welding, which will be eroded after a period of time and thus not durable. It is further disadvantage that the display of many pet cages in a compact space requires piling up of the cages. The connection of an upper cage and a lower cage is usually done by inserting the legs of the upper into the top side of the lower, forming a structure of low stability against external disturbances. The pets kept inside the cages would be easily frightened.

SUMMARY OF THE INVENTION

The primary objective of the present invention is to provide a combinative pet cage that can be assembled easily and folded compactly for carrying. A plurality of pet cages of the present invention can be easily piled up and secured to form a system of pet cages.

The main characteristic of a combinative pet cage according to the present invention is that the frame of each of the meshed boards is provided with screw holes for the insertion of the screw parts, whereby the meshed boards will be assembles to form a cage body. Further, the top and bottom faces of the frames of the front meshed board and the rear meshed board are provided with a plurality of insertion holes, whereby two such combinative pet cages can be connected vertically by the connecting parts. A plurality of pet cages can be connected in the same way, and the combined structure thereby formed will be stable.

The various objects and advantages of the present invention will be more readily understood from the following detailed description when read in conjunction with the appended drawings.

DETAILED DESCRIPTION OF THE PREFERRED EMBODIMENT

Figure 1:
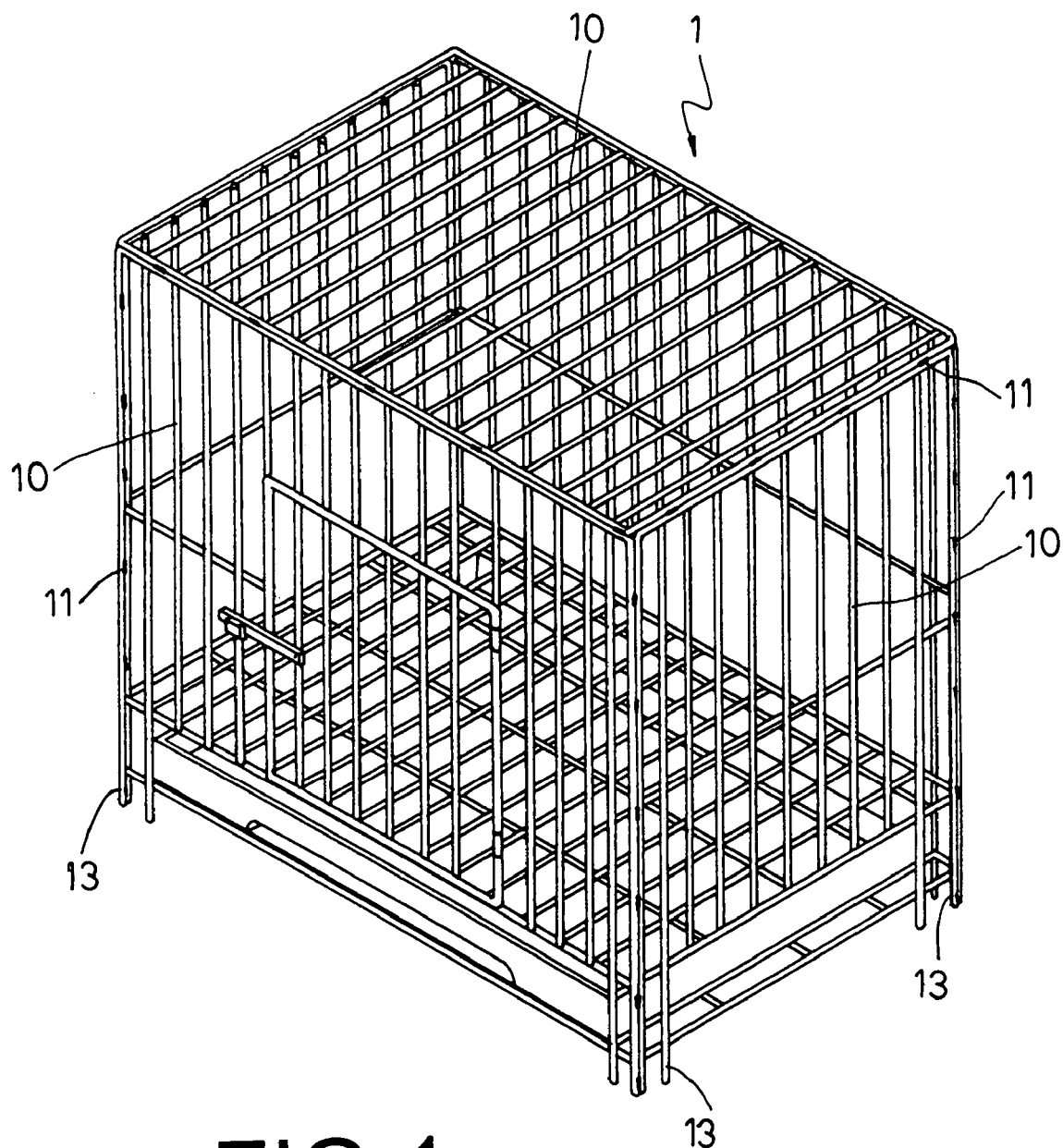
FIG. 1 is a perspective view of a pet cage of the prior art.
Figure 2:
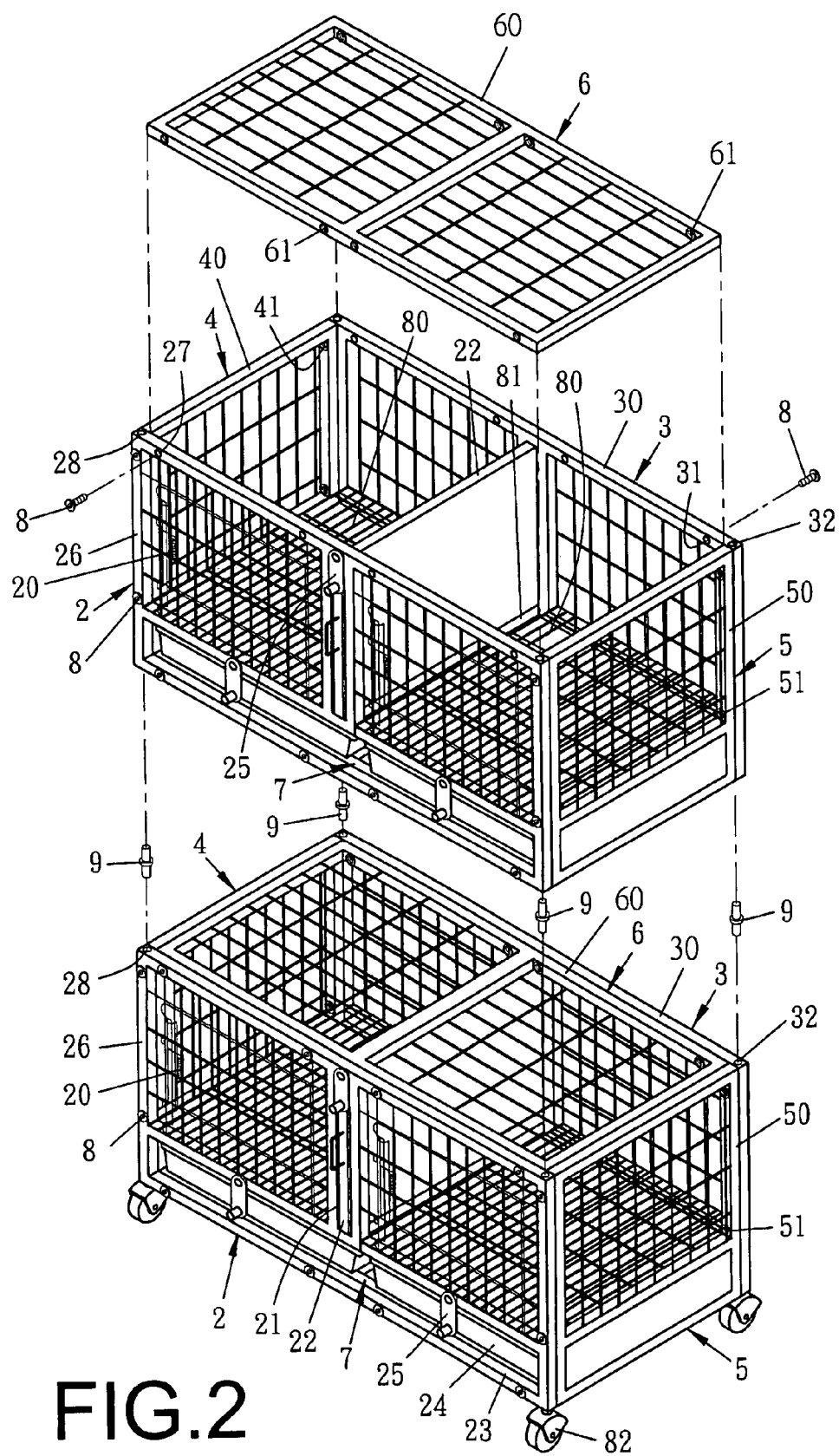
FIG. 2 is an exploded perspective view of a combinative pet cage of the present invention.
Figure 3:
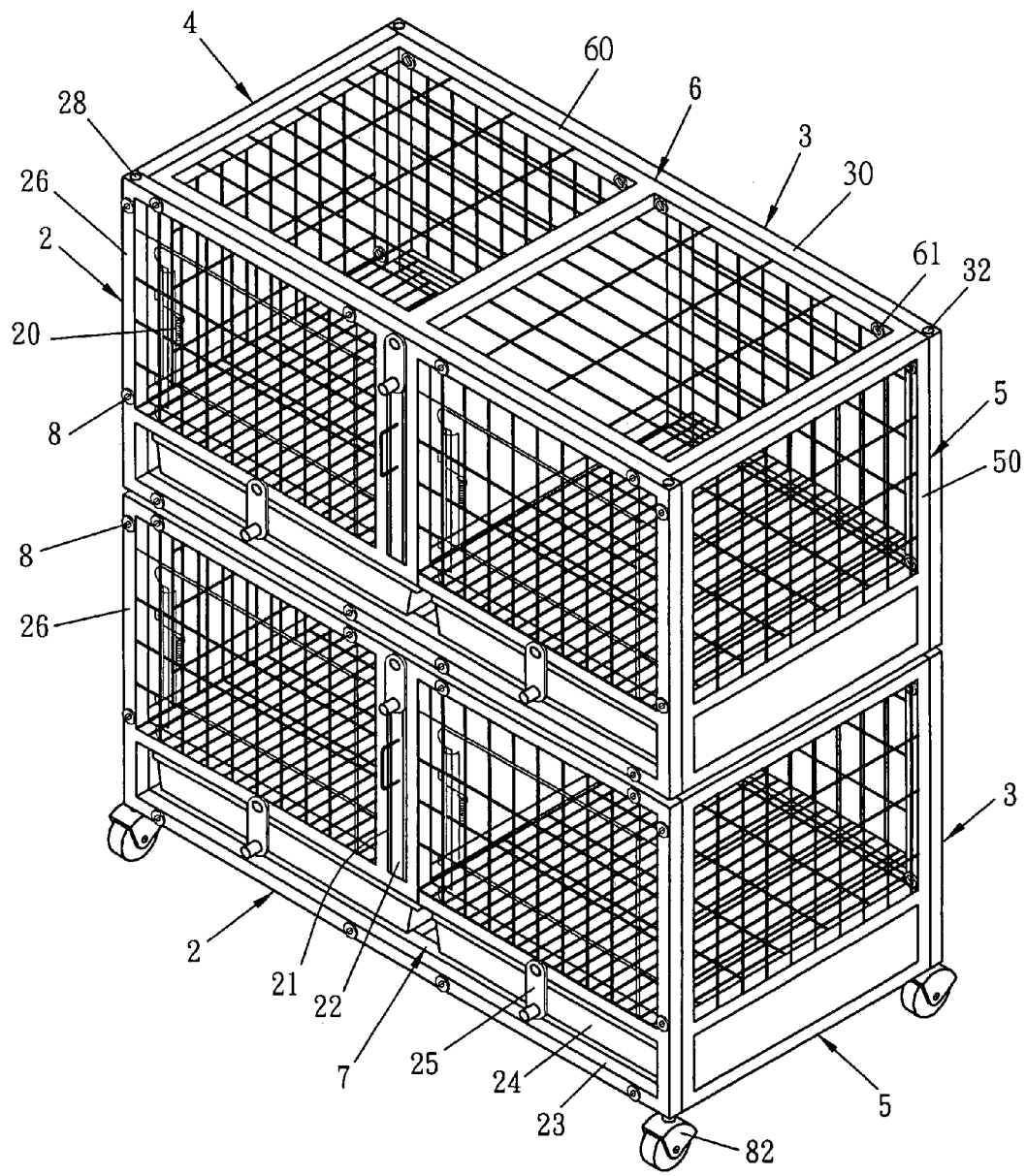
FIG. 3 is a perspective view of the combinative pet cage in FIG. 2.
Figure 4:
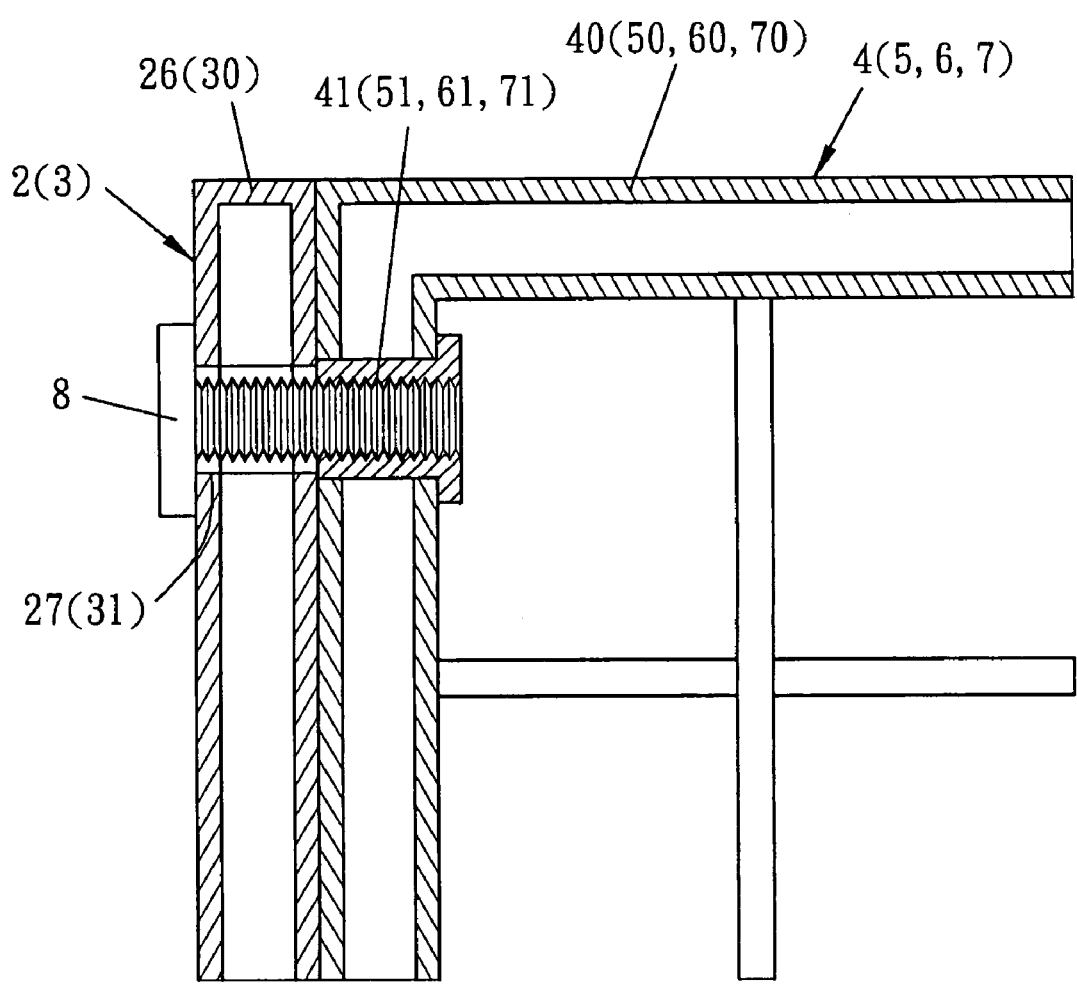
FIG. 4 is a partial assembled cross sectional view of the present invention.
Figure 5:
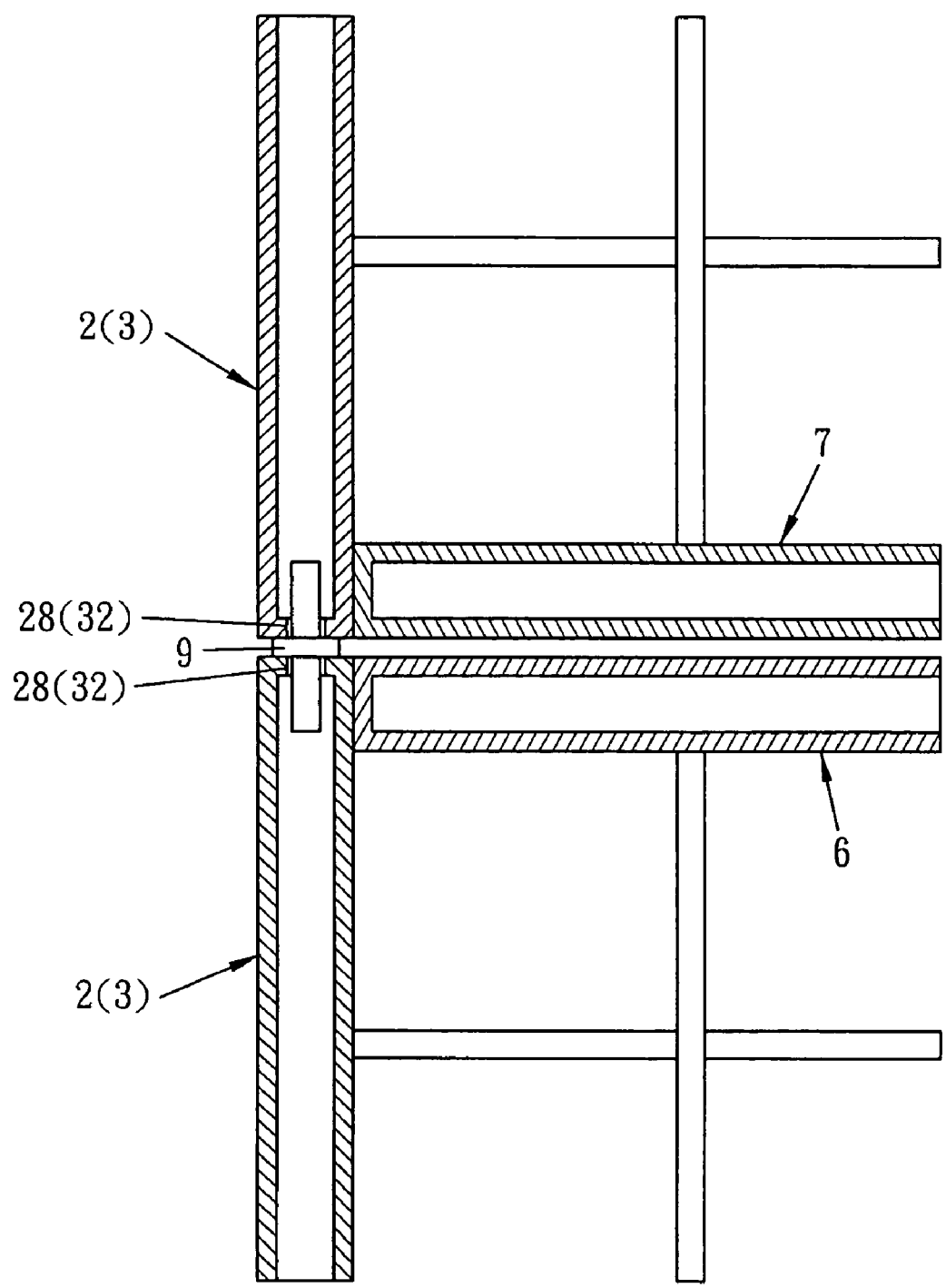
FIG. 5 is an assembled cross sectional view showing the upper and lower layers of the present invention.

Referring to FIGS. 2, 3 and 4, a combinative pet cage according to the present invention comprises a front meshed board 2, a rear meshed board 3, a left meshed board 4, a right meshed board 5, a top meshed board 6, a bottom meshed board 7, a plurality of screw parts 8, and a plurality of connecting parts 9. The front meshed board 2 has two doors 20 for a pet's passing in and out. In the middle of the front meshed board 2, there is a partition slot 21 for the insertion of a partition 22. At the bottom of the front meshed board 2 and on each side of the partition slot 21, there is a pan slot 23 for the insertion of a pan 24. The partition slot 21 and the pan slot 23 are further provided with respective latches 25 for retaining the partition 22 and the pan 24. The front face of the frame 26 of the front meshed board 2 is provided with a plurality of through holes 27 for the insertion of the screw parts 8, as shown in FIG. 4. The top and the bottom faces of the frame 26 of the front meshed board 2 are respectively provided with insertion holes 28 for the insertion of the connecting parts 9, as shown in FIG. 5. The rear meshed board 3 is opposite to the front meshed board 2 around the cage, having a plurality of through holes 31 on the front face of the frame 30 of the rear meshed board 3 for the insertion of the connecting parts 9, as shown in FIG. 4. The top and the bottom faces of the frame 30 of the rear meshed board 3 are respectively provided with insertion holes 32 for the insertion of the connecting parts 9, as shown in FIG. 5. The left meshed board 4 and the right meshed board 5 are respectively mounted on the right side and the left side between the front meshed board 2 and the rear meshed board 3, the front faces of the frames 40, 50 of which meshed board 4, 5 are provided with screw holes 41, 51 for the insertion of screw parts 8, as shown in FIG. 4. The top meshed board 6 and the bottom meshed board 7 are respectively mounted on the top side and the bottom side between the front meshed board 2 and the rear meshed board 3. The side faces of the frames 60, 70 of the meshed board 6, 7 are provided with screw holes 61, 71 for the insertion of screw parts 8, as shown in FIG. 4. As shown in FIG. 5, the connecting parts 9 are embedded in the insertion holes 28, 32 on the top and bottom faces respectively of the frame 26, 30 of the front meshed board 2 and the rear meshed board 3, thereby connecting two pet cages.

Referring to FIGS. 2, 3, and 4 for the assembly of the combinative pet cage. The front meshed board 2, the rear meshed board 3, the left meshed board 4, the right meshed board 5, the top meshed board 6, and the bottom meshed board 7 are secured by the screw parts 8 to form a cage body. The inner bottom sides of the front meshed board 2 and the rear meshed board 3 are further provided with partition meshes 80 for supporting the pets confined in the cage. Between the front meshed board 2 and the rear meshed board 3, there exists a transverse beam 81 for blocking the partition 22. The lower combinative pet cage further includes a plurality of wheels 82. The upper combinative pet cage is assembled in the same way, except that the wheels

82 are absent. The connecting parts 9 are firstly inserted into the insertion holes 28, 32 on the frames 26, 30 of the front meshed board 2 and the rear meshed board 3 of the lower combinative pet cage. The upper combinative pet cage is then mounted on the connecting parts 9 so that those two cages can be connected. Thereby, pet cages of the same type can be jointed stably, and the display space of pets can be maximized. For storing and delivering the combinative pet cage in a compact space, the combinative pet cage can be easily disassembled into various meshed boards by removing the screw parts 8. This will cut down the cost of delivering the combinative pet cages.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A combinative pet cage, comprising:
    a plurality of screw parts;
    a plurality of connecting parts;
    a front meshed board having at least one door for the entrance of pets, said front meshed board further including a plurality of through holes formed on selected faces of a frame thereof for the insertion of said screw parts, said front meshed board further including a plurality of insertion holes formed on top and bottom faces of said frame for the insertion of said connecting parts;
    a rear meshed board, said rear meshed board further including a plurality of through holes formed on selected faces of a frame thereof for the insertion of said screw parts, said rear meshed board further including a plurality of insertion holes formed on top and bottom faces of said frame for the insertion of said connecting parts;
    a left meshed board, said left meshed board further including a plurality of through holes formed on selected faces of a frame thereof for the insertion of said screw parts;
    a right meshed board, said right meshed board further including a plurality of through holes formed on selected faces of a frame thereof for the insertion of said screw parts;
    a top meshed board, said top meshed board further including a plurality of through holes formed on selected faces of a frame thereof for the insertion of said screw parts; and
    a bottom meshed board, said bottom meshed board further including a plurality of through holes formed on selected faces of a frame thereof for the insertion of said screw parts;
    whereby said meshed boards will be assembles to form a cage body, and whereby a plurality of said combinative pet cages can be connected vertically to form a combined structure;
    wherein a middle section of said front meshed board is further provided with a partition slot for the insertion of a partition for separating the inner space of said combinative pet cage; wherein a bottom side of said front meshed board is provided with two pan slots each for the insertion of a pan; wherein top surfaces of said pans are each covered with a partition mesh for supporting pets; and wherein said partition slot and said pan slot are respectively provided with a latch for securing said partition and said pan.

\* \* \* \* \*